United States Patent [19]
Marx

[11] 3,929,033
[45] Dec. 30, 1975

[54] VEHICLE PARKING BRAKE CONTROL

[75] Inventor: Thomas O. Marx, Rockton, Ill.

[73] Assignee: Atwood Vacuum Machine Company, Rockford, Ill.

[22] Filed: Nov. 20, 1974

[21] Appl. No.: 525,365

[52] U.S. Cl. .................. 74/512; 74/516; 74/518; 173/46; 173/100; 188/265
[51] Int. Cl.² ........................................ G05G 1/04
[58] Field of Search ...... 74/512, 516, 518; 188/265; 173/46, 100

[56] References Cited
UNITED STATES PATENTS

| | | | |
|---|---|---|---|
| 2,975,654 | 3/1961 | Vigmostad | 74/516 X |
| 3,199,367 | 8/1965 | Zetye | 74/516 X |
| 3,216,276 | 11/1965 | Nagy | 74/516 |
| 3,487,716 | 1/1970 | Hirst, Jr. | 74/516 |
| 3,625,087 | 12/1971 | Flory et al. | 74/518 |
| 3,693,471 | 9/1972 | Glance | 74/518 |

*Primary Examiner*—William F. O'Dea
*Assistant Examiner*—Ronald C. Capossela
*Attorney, Agent, or Firm*—Wolfe, Hubbard, Leydig, Voit & Osann, Ltd.

[57] ABSTRACT

A toothed sector is moved from a normal position to a hold position to apply the brake and is retained in its hold position by a pawl. As the sector is moved between its positions, a spring is loaded and biases an impactor toward the pawl, the impactor being held in a cocked position by a trigger. Release of the brake is effected by releasing the trigger to enable the spring to slam the impactor against the pawl and thereby move the latter out of engagement with the sector.

10 Claims, 10 Drawing Figures

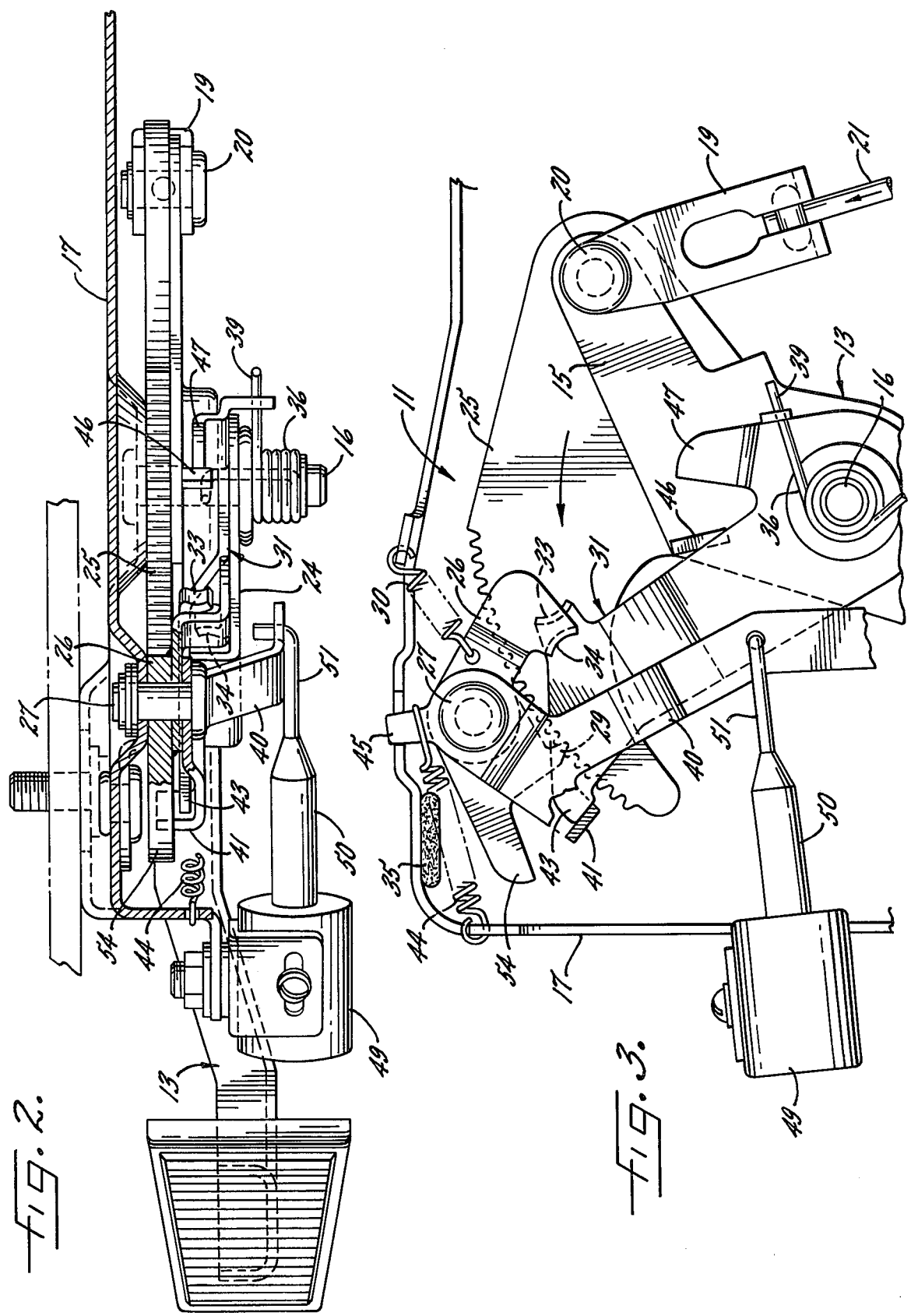

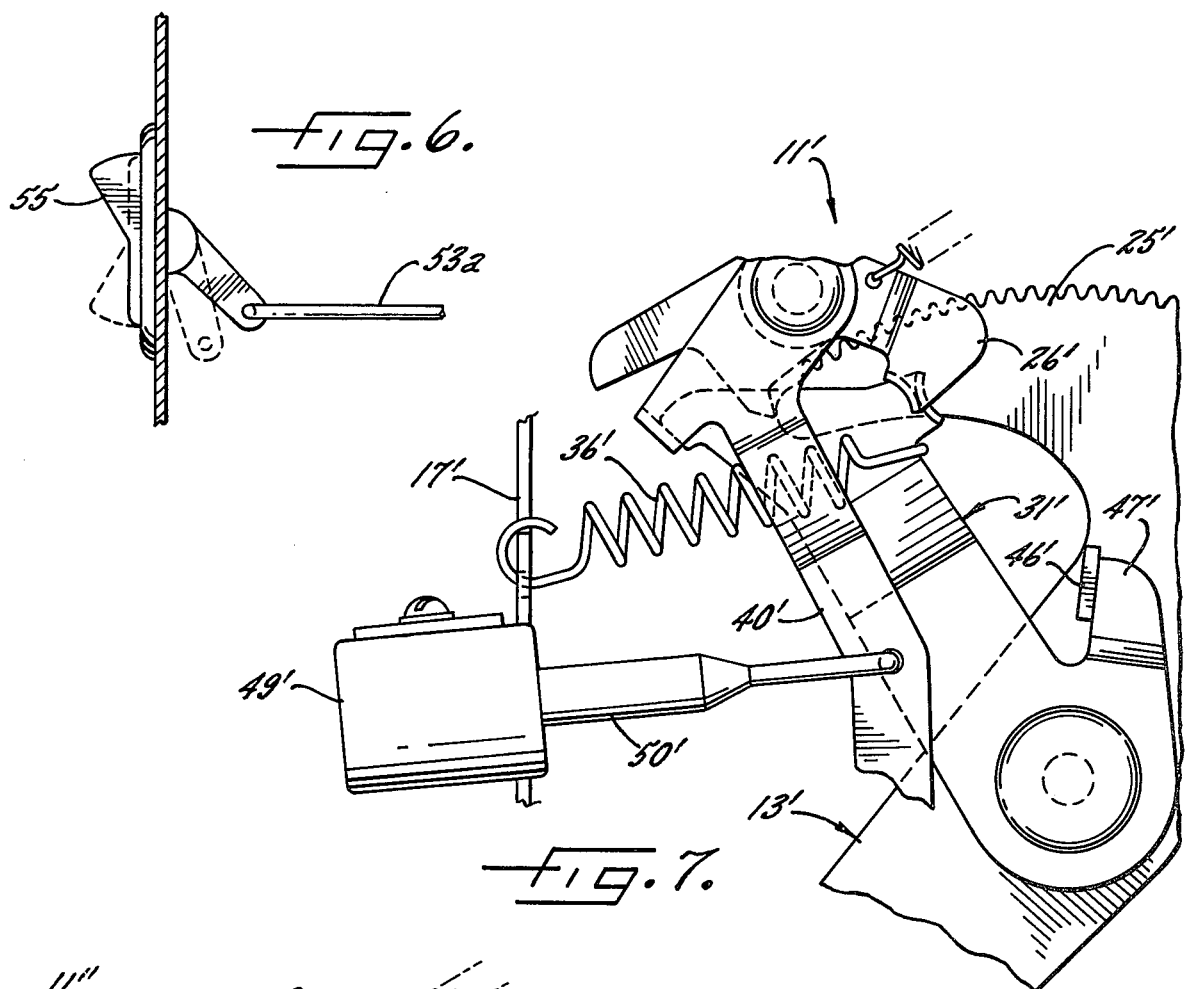
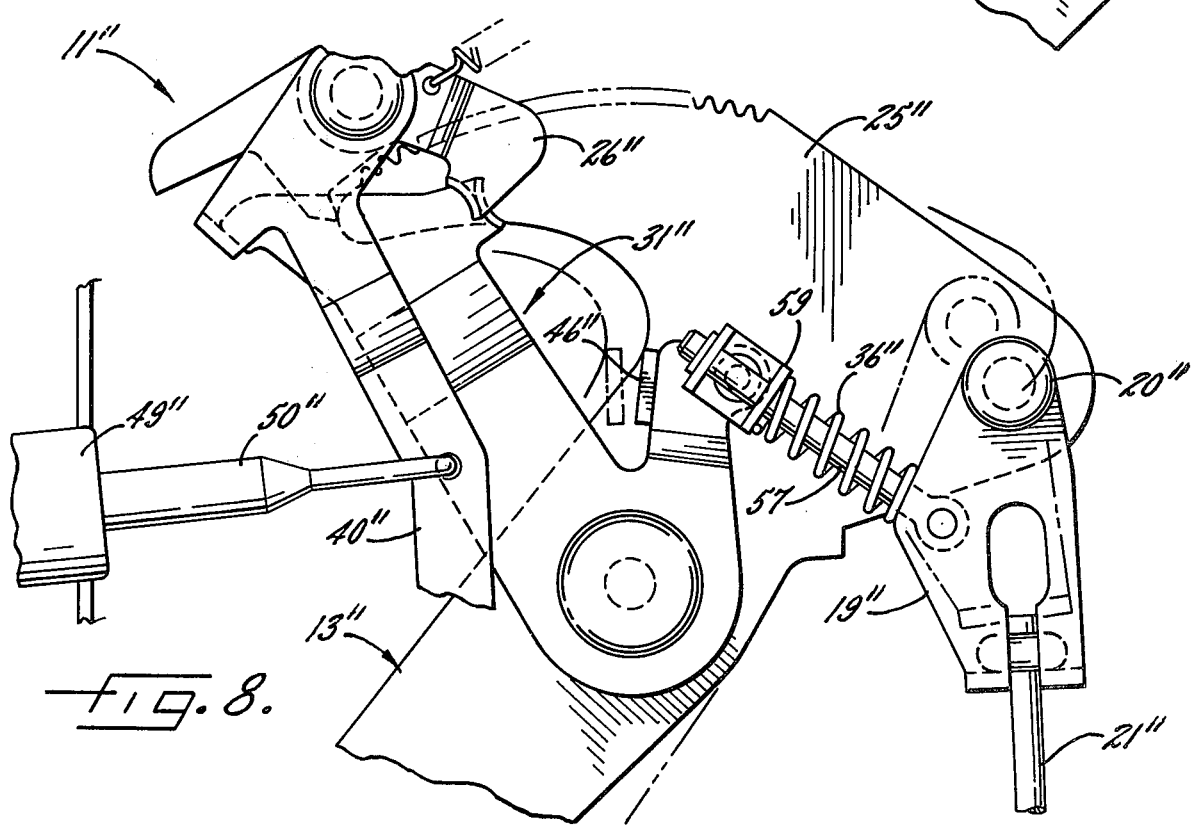

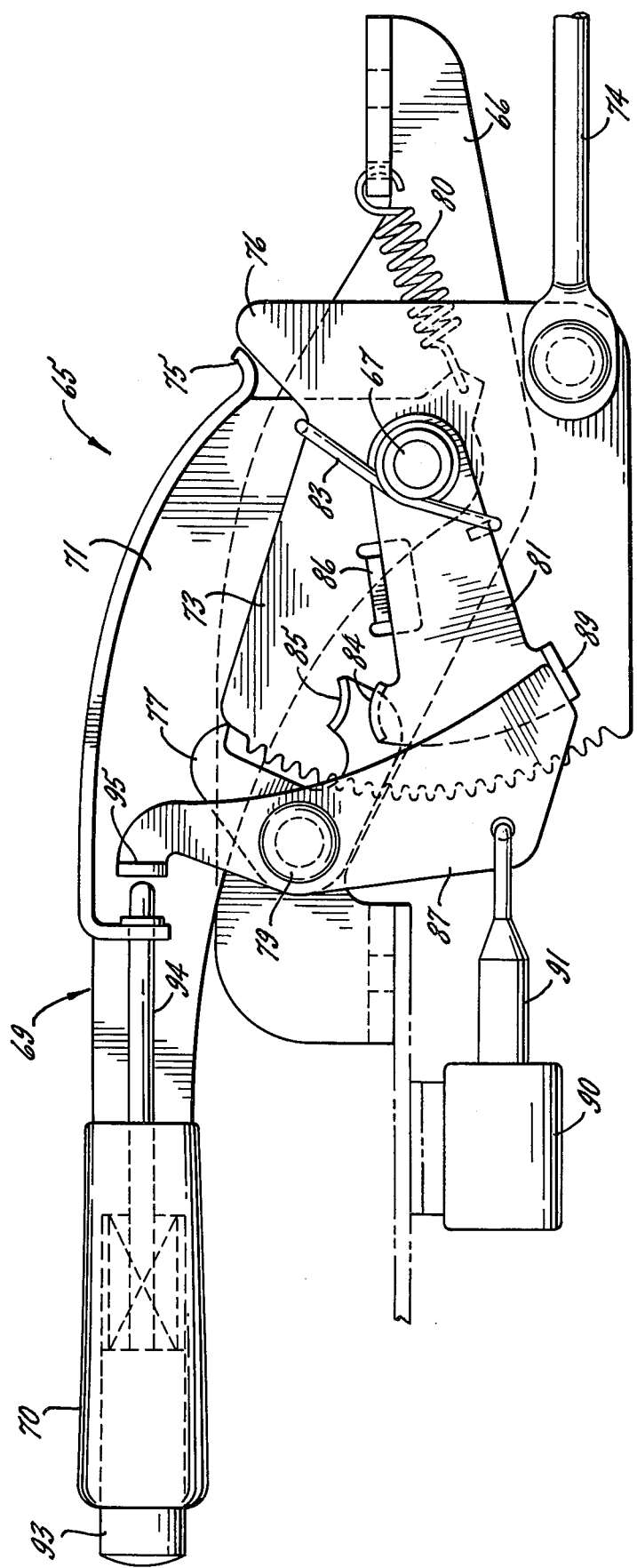

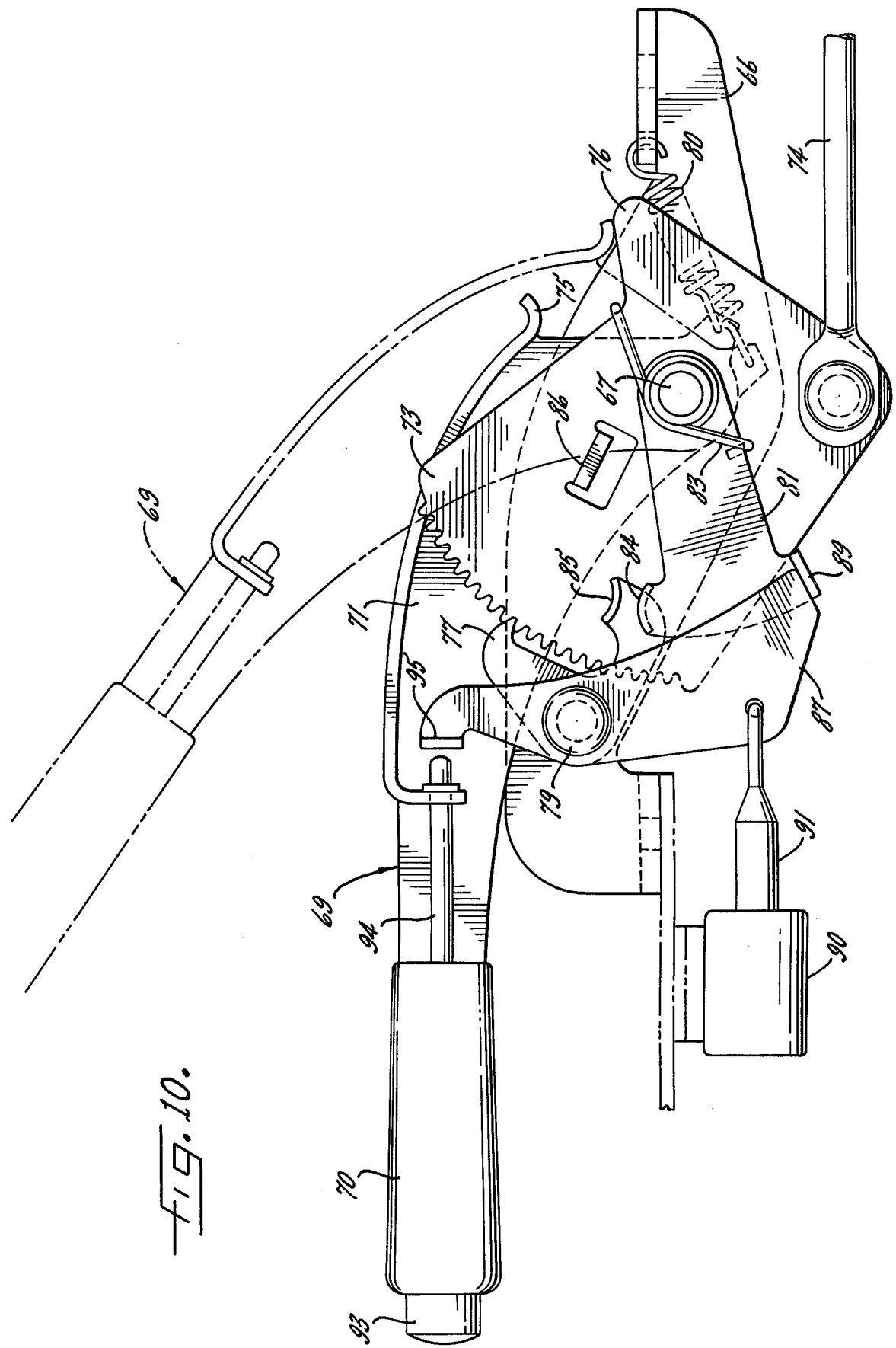

VEHICLE PARKING BRAKE CONTROL

BACKGROUND OF THE INVENTION

This invention relates to a control for a vehicle parking brake and, more particularly, to a control in which either a foot or hand operated actuator is adapted to be moved from a release position to an apply position in order to set the brake. As the actuator is moved to its apply position, a first member such as a toothed sector is moved to a hold position and pulls on a brake cable so as to set the brake, the brake remaining set as long as the first member remains in its hold position. The first member usually is retained in its hold position by a second member such as a pawl or latch which automatically engages the first member when the latter is moved to the hold position. When one member is moved out of engagement with the other member, the first member is allowed to return to its normal position to enable release of the brake.

A significant amount of force (e.g., 800 lbs.) must be exerted on the brake cable in order to set the brake to the degree required by existing standards. This force is retained by virtue of the engagement of the first and second members and thus a comparatively high level of force is required to disengage the two members when it is desired to release the brake.

SUMMARY OF THE INVENTION

The general aim of the present invention is to provide a new and improved parking brake control in which the energy required for disengaging the two members is developed automatically as an incident to movement of the first member between its positions so that comparatively little external force need be exerted in order to effect subsequent release of the brake. As a result, the brake can be released manually with relatively low effort or automatically with a relatively small and low cost power operator.

A more detailed object is to achieve the foregoing by providing a parking brake control in which an energy storage device is loaded as an incident to movement of a sector and in which the stored energy is subsequently used to develop the force needed to release a latch from the sector.

The invention further resides in the provision in the control of a novel impactor which is propelled into engagement with the latch by the stored energy and which strikes the latch with sufficient force to release the latch from the sector.

Another object of the invention is to provide a parking brake control of the above character in which the brake actuator is gently and automatically returned to its release position after application of the brake so as to protect the occupants of the vehicle from being struck by the actuator when the brake is released.

Still another object is to provide a low release effort parking brake control which may be used equally well with a foot-operated actuator or a hand-operated actuator.

A further object is to provide a low release effort parking brake control whose elements may be incorporated into the same basic envelope as presently used for high release effort controls.

These and other objects and advantages of the invention will become more apparent from the following detailed description when taken in conjunction with the accompanying drawings.

BRIEF DESCRIPTION OF THE DRAWINGS

FIG. 2 is a fragmentary cross-section taken substantially along the line 2—2 of FIG. 1.

FIG. 3 is a view similar to FIG. 1 but shows the control in the brake-applied position.

FIG. 6 is a fragmentary side elevation of a mechanism for effecting hand-operated release of the brake.

FIG. 7 is a fragmentary side elevation similar to FIG. 1 but shows a modified embodiment of the control.

FIG. 8 also is a fragmentary side elevation similar to FIG. 1 but shows another modified embodiment of the control.

FIG. 9 is a fragmentary side elevation of yet another embodiment of the control, the control being shown in the brake-released position.

FIG. 10 is a view similar to FIG. 9 but shows the control of FIG. 9 in the brake-applied position.

DETAILED DESCRIPTION OF THE PREFERRED EMBODIMENTS

Figure 1:
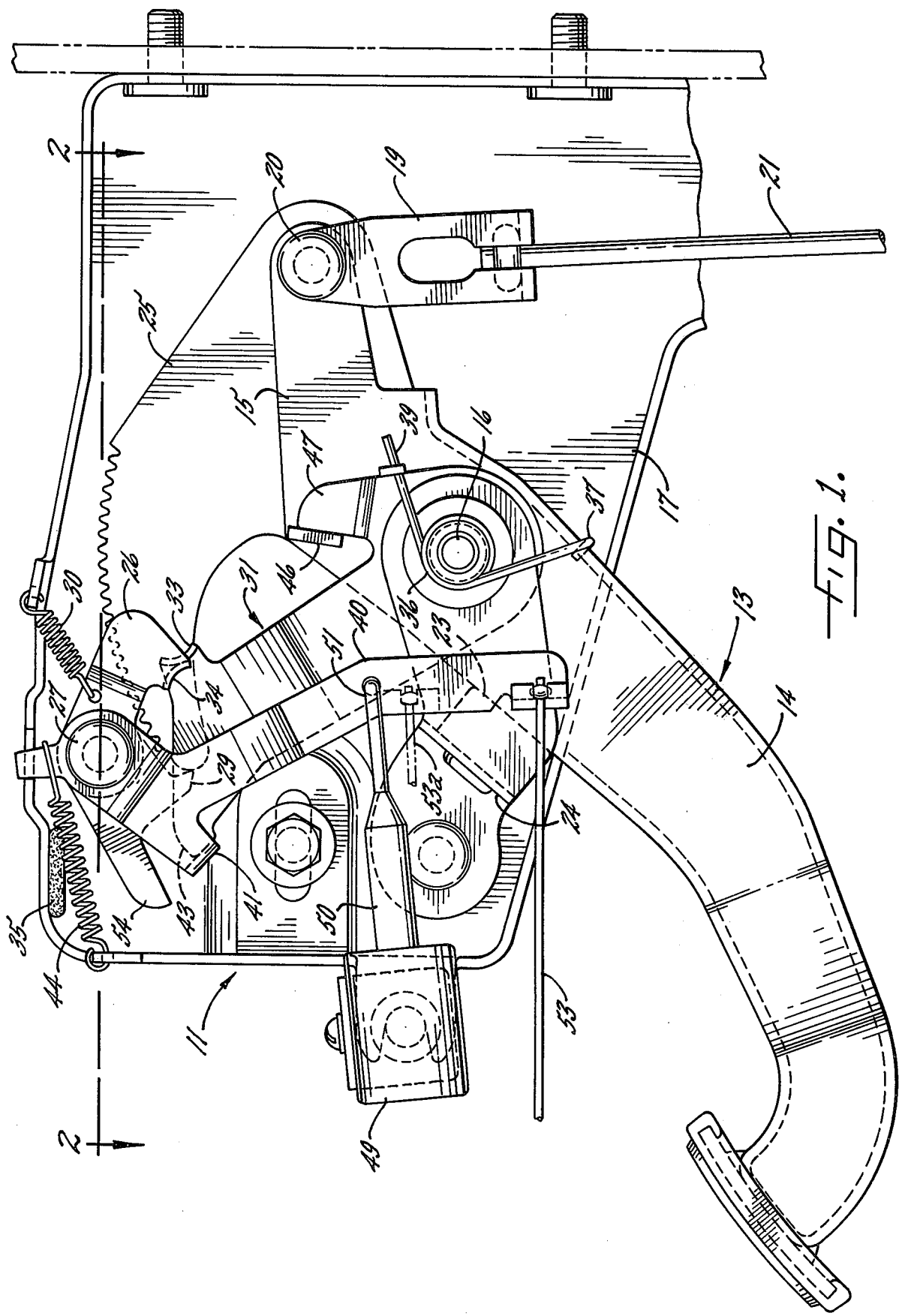
FIG. 1 is a fragmentary side elevation of one embodiment of a new and improved parking brake control incorporating the unique features of the invention, the control being shown in the brake-released position.

As shown in the drawings for purposes of illustration, the invention is embodied in a control 11 for setting and releasing the parking brake of a vehicle. The control shown in FIGS. 1 to 5 is of the foot-operated type in that the parking brake is set by depressing a foot-operated actuator which is in the form of a pivoted pedal 13 having arms 14 and 15.

The pedal 13 is supported intermediate the arms 14 and 15 to pivot between brake-release and brake-apply positions (FIGS. 1 and 3) about a horizontal pin 16 which is rigid with a support or bracket 17 adapted to be mounted in the vehicle beneath the instrument panel. When the pedal arm 13 is depressed in a counterclockwise direction, a clevis 19 which is pivoted at 20 on the pedal arm 15 pulls on a brake cable 21 to apply the brake. When the brake is released, the brake release springs (not shown) act through the cable to return the pedal clockwise to its original position. A shock absorbing bumper 23 is mounted on a plate 24 on the bracket 17 and engages the upper side of the pedal arm 14 to cushion and stop the return of the pedal.

Rigid with the pedal 13 is a member such as a toothed sector 25 which moves between normal and hold positions (FIGS. 1 and 3) when the pedal is moved between its release and apply positions, the brake remaining set as long as the sector is in its hold position. To retain the sector in such position, a member in the form of a latch or pawl 26 is supported on the bracket 17 to turn about a horizontal pin 27 and is formed with a tooth 29 which is urged into engagement with the sector by a contractile spring 30 stretched between the pawl and the bracket. When the sector is in its normal position (FIG. 1), the pawl tooth rests against one end of the sector. As the sector is pivoted counterclockwise, the teeth of the sector ratchet past the pawl which, upon stopping of the sector, automatically drops behind a tooth to retain the sector in its moved position (see FIG. 3).

In many vehicles, a force on the order of 800 pounds is exerted on the cable 21 when the brake is fully applied. This force is opposed at the point of engagement of the pawl 26 with the sector 25. Thus, a substantial amount of force must be applied to the pawl in order to pivot the latter out of engagement with the sector and enable release of the brake.

According to the present invention, energy which is developed during movement of a member such as the sector 25 is stored and is subsequently used in a novel manner to create the force necessary to disengage the pawl 26 and the sector. As a result, the brake may be released by applying only a very small external force to the control 11 so as to enable the release to be effected with a comparatively low manual force or with a relatively compact and inexpensive power operator.

Figure 4:
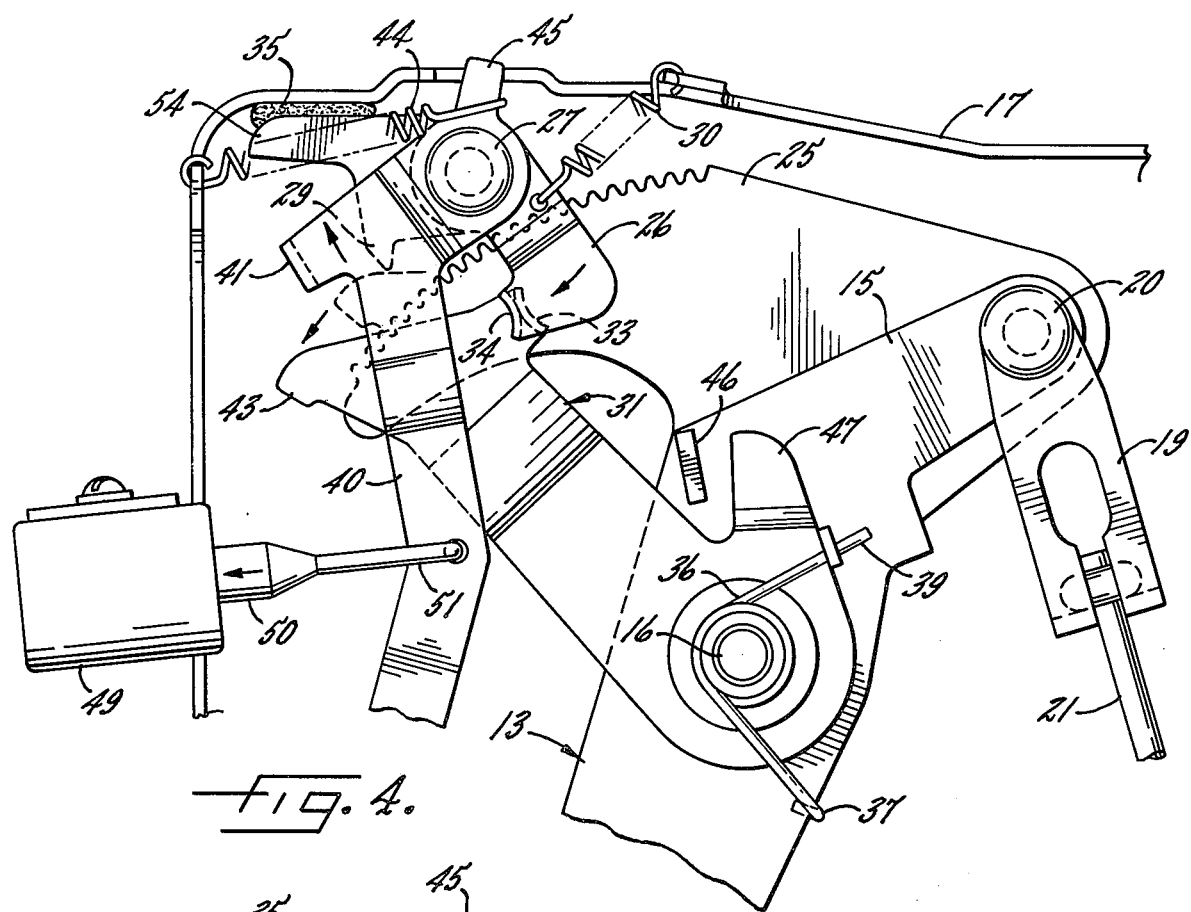
FIGS. 4 and 5 are views similar to FIG. 3 but show successive positions of parts of the control during release of the brake.

In one manner of carrying out the invention, the control 11 is provided with a unique releaser or impactor 31 which the stored energy propels against the pawl 26 in order to release the pawl from the sector 25. More specifically, the impactor comprises a lever which is pivotally mounted on the pin 16 to swing counterclockwise from a cocked position (FIG. 3), to a striking position (FIG. 4). When the impactor is in its cocked position and the pawl is holding the sector, a lug 33 on the impactor is spaced from an opposing lug 34 on the pawl, the spacing herein being approximately ⅜ inch. As the impactor reaches the striking position, the lug 33 slams against the lug 34 and pivots the pawl 26 clockwise to release the pawl tooth 29 from the sector 25 and thus release the vehicle brake. A resilient bumper 35 is mounted on the bracket 17 and receives the impact of the released pawl to dampen noise and to dissipate the remaining energy of the moving pawl.

In this instance, the energy for propelling the impactor 31 into striking relationship with the pawl 26 is developed as an incident to depressing the brake pedal 13. For this purpose, an energy storing means in the form of a torsion spring 36 is telescoped over the pin 16 and is anchored at one end 37 to the pedal and at the other end 39 to the impactor. When the pedal is in its released position, the impactor is held in its cocked position shown in FIG. 1. As the pedal is depressed to the position shown in FIG. 3 the spring 36 is loaded or wound and exerts a counterclockwise biasing force on the impactor so as to urge the latter from its cocked position toward its striking position.

The impactor 31 is adapted to be releasably held in its cocked position by a release trigger 40. The latter comprises a lever which is pivoted on the pin 27 and which is formed with a tab 41 normally adapted to engage an opposing ear 43 on the impactor. A contractile spring 44 is stretched between the bracket 17 and an ear 45 on the trigger to urge the trigger in a counterclockwise direction. When the trigger 40 is swung clockwise, the tab 41 releases the ear 43 to permit the torsion spring to swing the impactor counterclockwise from its cocked position to its striking position.

To explain the operation of the control 11 as described thus far, let it be assumed that the pedal 13 is in its released position and that the trigger 40 is holding the impactor 31 in its cocked position as shown in FIG. 1. As the pedal is depressed, the sector 25 ratchets past the pawl 26 and then is held by the pawl tooth 29, the lug 34 on the pawl being swung into spaced relationship with the lug 33 on the impactor as the ratchet moves past the pawl (see FIG. 3). Depression of the pedal also winds the torsion spring 36 and thus develops potential energy which is subsequently used to propel the impactor from its cocked position.

Figure 5:
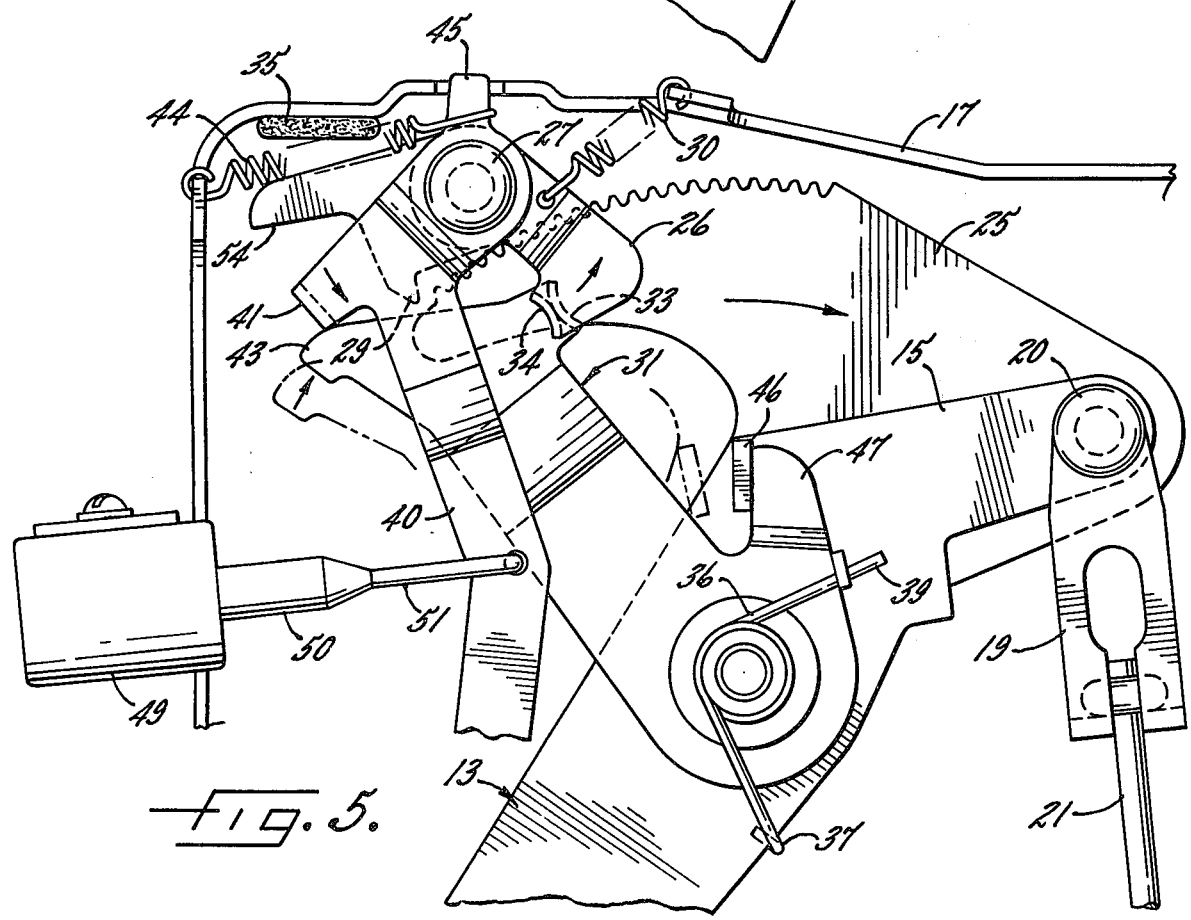

When the brake is to be released, the trigger 40 is pivoted clockwise from the position shown in FIG. 3 to the position shown in FIG. 4. As a result, the tab 41 on the trigger moves out of engagement with the ear 43 on the impactor 31 so as to release the latter to the action of the spring 36. The potential energy stored in the spring thus is converted into kinetic energy which propels the impactor counterclockwise to cause the lug 33 on the impactor to slam against the lug 34 on the pawl 26 and pivot the pawl clockwise out of engagement with the sector 25 (see FIG. 4). The brake release springs then act through the cable 21 to return the pedal 13 and the sector 25 to their release and normal positions, respectively, shown in FIG. 1. As the pedal returns clockwise toward its release position, a tab 46 on the pedal arm 15 engages an ear 47 on the impactor as shown in FIG. 5 and returns the impactor clockwise from its striking position to its cocked position so as to reset the impactor for the next operating cycle. During the return of the impactor, the spring 44 swings the trigger counterclockwise to re-engage the tab 41 with the ear 43 and thus hold the impactor in its cocked position when the pedal is next depressed and the tab 46 is moved away from the ear 47.

From the foregoing, it will be apparent that energy for releasing the pawl 26 is stored as an incident to depressing the pedal 13. When the impactor 31 is propelled from its cocked position, its inertia causes the lug 33 to sharply strike the lug 34 with substantial force, the impactor thus acting much like a hammer. By taking advantage of the inertia of the impactor to release the pawl, the spring force which acts on the cocked impactor may be relatively small. Accordingly, the force required to release the trigger 40 from the impactor is low when compared with that required to release the pawl from the sector 25. Thus, release of the vehicle brake may be effected by applying only a small external force to the trigger 40 to pivot the latter to its position shown in FIG. 4.

The external force for releasing the trigger 40 may be applied to the trigger by a direct manual operation or by an automatic operation which occurs, for example, when the shift lever of a vehicle with an automatic transmission is moved from park or neutral and into any drive position. If the vehicle is equipped with a manual transmission, automatic release of the brake may be effected when the shift lever is moved from neutral while the engine is running.

To enable automatic release of the brake, provision is made of a power operator such as a solenoid 49 which is mounted on the bracket 17, the armature 50 of the solenoid being connected to the release trigger 40 by a link 51. The solenoid is adapted to be energized automatically by movement of the shift lever from park or neutral and, as the solenoid is energized, the armature is retracted as shown in FIG. 4 to pivot the trigger clockwise and release the impactor 31. Because only a low force is required to pivot the trigger, the solenoid may be relatively small in size and may operate with a comparatively short stroke. As an alternative to the solenoid, a power operator in the form of a cylinder actuated by manifold vacuum could be used to release the trigger 40. Again, only a small cylinder is required to develop the low force for releasing the trigger.

In some instances, the solenoid 49 will be energized only momentarily to release the trigger and then will be immediately de-energized to pivot the trigger counterclockwise to its retaining position. In other cases, the solenoid can be kept in an energized condition at all times when the shift lever is in a drive gear. Under these circumstances, the impactor 31 will not be retained in its cocked position and thus, if it is necessary to bring the vehicle to an emergency stop, the pedal 13 may be repeatedly depressed and released in the same fashion as the standard brake pedal. As an incident thereto, the impactor will move back and forth between its cocked and striking positions and will repeatedly move the pawl 26 out of engagement with the sector 25. In this way, the vehicle brake will be first applied and then released to enable the vehicle to be safely slowed.

If the solenoid 49 should become inoperable, the impactor 31 can be released by a direct manual operation. In this instance, this is achieved with a cable 53 (FIG. 1) which is connected to the lower end portion of the trigger 40 and leads to a hand knob (not shown) on the vehicle instrument panel. By manually pulling the cable 53 with low effort, the trigger 40 can be released from the impactor 31 even if the solenoid should fail to operate. If the torsion spring 36 fails or if the impactor 31 malfunctions, release of the brake still can be effected manually by pulling the cable 53. As the cable 53 pivots the trigger clockwise to a position past that required to release the impactor, the tab 41 on the trigger engages an ear 54 on the pawl 26 and pivots the latter out of engagement with the sector 25. It should be realized that this operation requires the exertion of a relatively high force on the cable 53 since the force for releasing the pawl is developed manually rather than by the spring 36 and the inertia of the impactor 31.

While the control 11 of the present invention enables release of the brake with a comparatively small and inexpensive power operator 49, it also provides a substantial advantage in installations where it is desired to effect the release solely by a direct manual operation. That is, the spring 36 and the impactor 31 enable the pawl 26 to be released by exerting a very low manual force on the cable 53 and by pulling the cable through only a short stroke if the cable is attached to the trigger 40 at a point nearer to the pivot pin 27 as indicated by the cable 53a shown in phantom in FIG. 1. Accordingly, the manual release effort and stroke requirements are small when compared with previous controls. Indeed, the release effort is so small and the required cable stroke is so short that the free end of the cable 53a can be connected to a dash-mounted push button 55 (FIG. 6) which may be depressed to effect release of the brake. Alternatively, the cable 53a can be linked to the vehicle shift lever and arranged to be pulled directly by the shift lever when the latter is moved to a drive gear position.

Another embodiment of a control incorporating the features of the invention is shown in FIG. 7 in which parts corresponding to those of the first embodiment are indicated by the same but primed reference numerals. In the case of the control 11', the energy storing means is in the form of a contractile spring 36' which is stretched between the bracket 17' and the impactor 31' so as to urge the latter in a counterclockwise direction toward its striking position. The spring 36' is loaded or stretched when the pedal 13' is returned to its released position by the brake release springs. Such return causes the tab 46' to engage the ear 47' and move the impactor clockwise to its cocked position to stretch the spring. Thus, the contractile spring 36' is loaded on the release stroke of the pedal 13' rather than on the apply stroke as in the case of the torsion spring 36. The contractile spring does not, therefore, result in any increase in the effort required to depress the pedal. Also, the contractile spring tends to slow and cushion the return of the pedal and makes it possible to use a pedal stop plate with a comparatively light shock absorbing bumper or with no bumper at all.

FIG. 8 shows a third embodiment whose parts are indicated by double primed reference numerals. The control 11'' includes an energy storing means in the form of a compression spring 36'' which is telescoped over a rod 57. The latter is pivotally connected at one of its ends to the clevis 19'' and is slidably received at its other end in a bracket 59 pivotally attached to the impactor 31''. Thus, the spring 36'' is compressed between the clevis 19'' and the bracket 59.

When the pedal 13'' is depressed to apply the brake, the clevis 19'' swings clockwise about its pivot 20'' as the load on the brake cable 21'' increases (see the phantom line position shown in FIG. 8). Accordingly, the spring 36'' is loaded to bias the impactor 31'' in a counterclockwise direction. The magnitude of the spring load increases directly as a function of increases in the cable load and thus the amount of energy stored in the spring is directly related to the force required to release the pawl 26''. Thus, the spring is loaded to no greater degree than is necessary and hence resists depression of the pedal only by an amount related to the load imposed on the brake cable 21''.

The embodiment of the invention shown in FIGS. 9 and 10 comprises a hand-operated control 65 which is located in the tunnel or console of the vehicle. The control comprises a fixed support or bracket 66 with a pin 67 which pivotally mounts an actuator or handle 69 to swing between a substantially horizontal release position (FIG. 9) and an upright apply position (shown in phantom lines in FIG. 10). A hand grip 70 is attached to one end of the handle 69 while the other end of the handle is defined by a housing 71 which overlies and straddles the bracket 66. The control 65 further includes a toothed sector member 73 which is pivoted on the pin 67 to swing between normal and hold positions (FIGS. 9 and 10). A cable 74 is connected to the sector and is linked to the vehicle brake.

An important feature of the control 65 is that the handle 69 can be swung upwardly to its apply position to move the sector 73 to its hold position and then will automatically return downwardly to and remain in its release position with a gentle motion while leaving the sector in its hold position. As a result, the handle already will be in its downward release position when the brake is released and thus will not fly downwardly and cause possible injury to the occupants of the vehicle.

More specifically, the foregoing is achieved by providing a lost-motion connection between the handle 69 and the sector 73. Herein, the lost-motion connection comprises a tab 75 formed on the housing 71 of the handle and adapted to coact with an ear 76 which is formed on the sector 73. When the handle is pivoted upwardly or clockwise to its apply position as shown in phantom in FIG. 10, the tab 75 engages the ear 76 and turns the sector clockwise to its hold position. As the sector turns, it ratchets past a spring-urged pawl 77 which is pivoted on a pin 79 on the bracket 66, the pawl serving to retain the sector in its hold position.

When the driver manually releases the handle 69, it is automatically returned downwardly to its horizontal release position by a contractile spring 80 which is stretched between the bracket 66 and the housing 71. The lost-motion connection formed by the tab 75 and the ear 76 enables the handle to return downwardly without imparting any movement to the sector 73 so that the latter remains in its hold position to keep the brake applied (see the full line position in FIG. 10). The contractile spring 80 is comparatively weak and thus the handle is returned downwardly with a rather gradual motion.

To release the pawl 77 from the sector 73 and thus release the brake, the control 65 includes a releaser or impactor 81 which is pivotally supported on the pin 67 to turn clockwise from a cocked position to a striking position. The impactor is urged toward its striking position by a torsion spring 83 which is telescoped over the pin and whose ends are connected to the sector and the impactor. Clockwise pivoting of the sector toward its hold position serves to load the spring and thus store the energy for subsequently propelling the impactor toward its striking position. When the impactor 81 reaches the striking position, a lug 84 on the impactor slams against a lug 85 on the pawl 77 and pivots the pawl counterclockwise out of engagement with the sector 73 to enable the latter to return counterclockwise to its normal position and release the brake. Although the sector is returned rapidly to its normal position by the brake release springs, no movement is imparted to the handle 69 since the ear 76 on the sector merely returns idly to a position adjacent the tab 75 on the handle. As the sector returns, a tab 86 struck out of the sector moves into engagement with the impactor and pivots the impactor in a counterclockwise direction to its cocked position.

The impactor 81 is releasably retained in its cocked position by a trigger 87 which is pivoted on the pin 79 and whose lower end is adapted to engage a tab 89 on the impactor. A solenoid 90 is mounted on the bracket 66 and, when its armature 91 is retracted, the trigger 87 is pivoted clockwise to release the impactor 81 to the action of the spring 83. Alternatively, the trigger may be released manually from the impactor by depressing a push button 93 which is slidably mounted in the handle 69. When the handle is in its release position and the button is depressed, a rod 94 engages a tab 95 on the trigger to pivot the trigger clockwise about the pin 79. When the handle is in its upward apply position, the rod 94 is not alined with the tab 95 and thus the trigger cannot be released. Accordingly, there is no danger of the handle flying downwardly and possibly injuring the driver if he attempts to manually release the brake while the handle is in its upward position. An electrical interlock (not shown) can be associated with the solenoid 90 to prevent the latter from being energized when the handle is in its upward position.

If desired, the foot-operated controls 11, 11' and 11" may be constructed so that a lost-motion connection is provided to enable the pedal to return idly to its release position after moving the sector to its hold position. Such a construction avoids any danger of the driver being struck by the pedal when the brake is released.

From the foregoing, it will be apparent that the present invention brings to the art several embodiments of a new and improved parking brake control which may be released with relatively low effort. As a result, automatic release of the control can be effected with a relatively simple and low cost power operator such as a solenoid and manual release can be effected in an easy and simple manner. While the disclosed embodiments utilize torsion, contractile and compression springs for storing the energy for propelling the impactor, it will be appreciated that other types of energy storing devices such as a rubber bumper or a gas spring could be used in the control. Also, the impactor need not necessarily be coaxial with the sector but could be coaxial with the pawl or else mounted on an entirely separate pivot.

I claim as my invention:

1. A vehicle parking brake control comprising a support, an actuator mounted on said support to move between release and apply positions, the movement of said actuator to said apply position being effective to set the vehicle parking brake, a member associated with said actuator and movable from a normal position to a hold position when said actuator is moved from said release position to said apply position, the vehicle parking brake being held in a set condition when said member is retained in said hold position and being released when said member is returned to said normal position, a latch movably mounted on said support and automatically engageable with said member to retain the member releasably in said hold position when the member is moved to such position, an impactor mounted on said support for movement between a cocked position in which the impactor is spaced from said latch and a striking position in which the impactor slams against said latch, means for releasably retaining said impactor in said cocked position when said member is in said hold position, and energy storing means associated with said impactor and positioned to be loaded as an incident to movement of said member from one of its positions to the other of its positions, said energy storing means being operable when loaded to bias said impactor away from said cocked position and toward said striking position whereby said impactor is propelled away from said cocked position upon being released by said retaining means and slams against said latch to release the latter from said member and permit the member to return to its normal position to release the vehicle parking brake.

2. A vehicle parking brake control as defined in claim 1 further including means engageable with said impactor to move the latter from said striking position to said cocked position when said member is moved from one of its positions to the other of its positions.

3. A vehicle parking brake control as defined in claim 1 in which said energy storing means are positioned to be loaded as an incident to movement of said member from its normal position to its hold position.

4. A vehicle parking brake control as defined in claim 3 in which said energy storing means comprises a spring connected between said impactor and one of said actuator and said member.

5. A vehicle parking brake control as defined in claim 1 in which said energy storing means are positioned to be loaded as an incident to movement of said member from its hold position to its normal position.

6. A vehicle parking brake control as defined in claim 5 further including means for moving said impactor from said striking position to said cocked position as said member moves from its hold position to its normal position, said energy storing means comprising a spring adapted to be loaded when said impactor is moved to said cocked position.

7. A vehicle parking brake control as defined in claim 1 in which said member comprises a toothed sector which is moved back and forth between said normal and hold positions by back and forth movement of said actuator between its release and apply positions.

8. A vehicle parking brake control as defined in claim 1 in which said member comprises a toothed sector, a lost-motion connection between said sector and said actuator and effective to move said sector to said hold position when said actuator is moved to said apply position while allowing said sector to remain in said hold position when said actuator is moved to its release position, and means biasing said actuator toward its release position so as to automatically return the actuator to such position immediately after the actuator has been moved to its apply position.

9. A vehicle parking brake control comprising a support, an actuator mounted on said support to pivot between release and apply positions, the movement of said actuator to said apply position being effective to set the vehicle parking brake, a toothed sector connected to said actuator and pivotable from a normal position to a hold position when said actuator is pivoted from said release position to said apply position, the vehicle parking brake being held in a set condition when said toothed sector is retained in said hold position and being released when said sector returns to said normal position, a pawl pivotally mounted on said support and urged into engagement with said sector so as to ratchet relative to the sector when the latter is moved from its normal position and to retain the sector releasably in its hold position when the sector reaches such positions, an impactor pivotally mounted on said support to swing between a cocked position in which the impactor is spaced from said pawl and a striking position in which the impactor slams against said pawl, means for releasably retaining said impactor in said cocked position when said sector is in said hold position, a spring acting on said impactor and positioned to be loaded as an incident to movement of said sector from one of its positions to the other of its positions, said spring being operable when loaded to bias said impactor away from said cocked position and toward said striking position whereby said impactor is propelled away from said cocked position by said spring upon being released by said retaining means and slams against said pawl to release the latter from said sector and permit the sector to return to its normal position to release the vehicle parking brake, and means engageable with said impactor during the return of said sector to its normal position and operable as an incident to such engagement to move said impactor to said cocked position.

10. A vehicle parking brake control comprising a support, a first member mounted on said support and movable between a normal position and a hold position, the vehicle parking brake being held in a set condition when said first member is retained in said hold position and being released as said first member returns to said normal position, a second member on said support and automatically engageable with said first member to retain the first member releasably in its hold position when the first member is moved to such position, a releaser on said support and movable between a first position in which the releaser permits said members to remain in engagement and a second position in which the releaser forces one of said members out of engagement with the other of said members, means for releasably retaining said releaser in said first position when said first member is in said hold position, energy storing means associated with said releaser and positioned to be loaded as an incident to movement of said first member from one of its positions to the other of its positions, said energy storing means being operable when loaded to bias said releaser away from said first position and toward said second position whereby said releaser is urged away from said first position by said energy storing means upon being released by said retaining means and forces said one member out of engagement with said other member to permit the first member to return toward its normal position and release the vehicle parking brake, and means engageable with said releaser during movement of said first member from one of its positions to the other of its positions and operable as an incident to such engagement to move said releaser to said first position.

* * * * *